United States Patent
Wang

(10) Patent No.: US 10,944,342 B2
(45) Date of Patent: Mar. 9, 2021

(54) SECURE ROLLER CONTROLLER OF ROLLER CONVEYOR SYSTEM FOR LOGISTICS SERVICES

(71) Applicant: Worldwide Logistics Corporation, New Taipei (TW)

(72) Inventor: Chi-Chiao Wang, New Taipei (TW)

(73) Assignee: Worldwide Logistics Corporation, New Taipei (TW)

( * ) Notice: Subject to any disclaimer, the term of this patent is extended or adjusted under 35 U.S.C. 154(b) by 80 days.

(21) Appl. No.: 16/281,172

(22) Filed: Feb. 21, 2019

(65) Prior Publication Data

US 2020/0274465 A1    Aug. 27, 2020

(51) Int. Cl.
*H02P 3/18* (2006.01)
*B65G 39/10* (2006.01)
*H02P 27/08* (2006.01)

(52) U.S. Cl.
CPC ............. *H02P 3/18* (2013.01); *B65G 39/10* (2013.01); *H02P 27/08* (2013.01)

(58) Field of Classification Search
CPC combination set(s) only.
See application file for complete search history.

(56) References Cited

U.S. PATENT DOCUMENTS

| | | | |
|---|---|---|---|
| 5,213,201 A | 5/1993 | Huber et al. | |
| 6,775,568 B2 | 8/2004 | Peck | |
| 6,827,202 B2 | 12/2004 | Topmiller et al. | |
| 6,959,804 B2 | 11/2005 | Helgerson et al. | |
| 8,042,681 B2 | 10/2011 | Chuang | |
| 2004/0134754 A1* | 7/2004 | Grafer | B65G 43/10 198/465.1 |
| 2005/0065641 A1 | 3/2005 | Nagai | |
| 2006/0030968 A1* | 2/2006 | Ko | H01R 27/00 700/213 |
| 2008/0234858 A1* | 9/2008 | Dollens | G05B 19/4189 700/230 |
| 2009/0266678 A1* | 10/2009 | Horn | B65G 47/261 198/606 |
| 2010/0108472 A1 | 5/2010 | Chuang | |

(Continued)

FOREIGN PATENT DOCUMENTS

JP        S63212010 A    9/1988

*Primary Examiner* — Kyle O Logan
(74) *Attorney, Agent, or Firm* — Alan D. Kamrath; Karin L. Williams; Mayer & Williams PC

(57) ABSTRACT

A secure roller controller of a roller conveyor system for logistics services includes a monitoring circuit, a controller module and a driving circuit and is electrically connected to a motor. The monitoring circuit is electrically connected to the controller module and the driving circuit to receive a power signal from the driving circuit. The controller module is electrically connected to the driving circuit to receive the power signal and instruct the driving circuit to drive the motor for speed adjustment according to the power signal. When instantly detecting that the power signal is irregular, the monitoring circuit transmits an irregularity signal to the controller module for the controller module to instantly decelerate a rotation speed of the motor to a safe rotation speed through the driving circuit. Accordingly, burn-down of the motor and the secure roller controller can be avoided to enhance operational stability and safety.

9 Claims, 18 Drawing Sheets

(56) References Cited

U.S. PATENT DOCUMENTS

2017/0082965 A1* 3/2017 Yamagishi ......... G03G 15/5008
2017/0137230 A1   5/2017 Combs et al.
2020/0095066 A1* 3/2020 Niu ....................... B65G 23/08

* cited by examiner

SECURE ROLLER CONTROLLER OF ROLLER CONVEYOR SYSTEM FOR LOGISTICS SERVICES

BACKGROUND OF THE INVENTION

1. Field of the Invention

The present invention relates to a roller controller of a roller conveyor system for logistics services and, more particularly, to a secure roller controller of a roller conveyor system for logistics services.

2. Description of the Related Art

Owing to fast development of electronic commerce, people can wait for the goods ordered online to be delivered to their doors. in answer to the required delivery services, E-commerce vendors will employ a conveyor system to effectively classify a multitude of goods through the conveyor system for the vendors to collectively arrange the goods for delivery.

Conventionally, a conveyor system for logistics services includes multiple roller activation controllers, multiple motors and multiple rollers. One of the multiple roller activation controllers controls a corresponding motor to rotate and drive a corresponding roller to rotate. As the roller activation controllers are mutually connected in series and the rollers are spaced apart by gaps, goods carried on the conveyor system can be moved along the rollers for transporting.

When goods to be transported are overweight, to effectively transport the goods, the rotation speed of the motors should be increased and additional current needs to be supplied to the motors. However, the foregoing roller activation controllers fail to detect whether the current to the motors exceeds a tolerable current limit. As a result, once the current supplied to the motors exceeds that current limit, the motors are prone to damage or failure. Besides, the roller activation controllers may get fried. All these may cause safety concern in operation.

SUMMARY OF THE INVENTION

An objective of the present invention is to provide a secure roller controller of a roller conveyor system for logistic services, capable of monitoring power of a motor in connection with the secure roller controller and ensuring that when the rotation speed of a motor is excessively high, power to the motor can be reduced and the rotation speed of the motor can be limited to protect the motor and the controller against burn-down.

To achieve the foregoing objective, the secure roller controller of a roller conveyor system for logistics services is electrically connected to a motor and includes a driving circuit, a monitoring circuit and a controller module.

The driving circuit is electrically connected to the motor.

The monitoring circuit is electrically connected to the driving circuit to receive a power signal of the driving circuit.

The controller module is electrically connected to the monitoring circuit and the driving circuit, receives the power signal, and outputs a motor control signal to the driving circuit according to the power signal for the driving circuit to drive the motor to adjust a rotation speed of the motor.

When the monitoring circuit instantly detects that the power signal is irregular, the monitoring circuit instantly transmits an irregularity signal to the controller module, and the controller module further outputs a contingency protection signal to the driving circuit according to the irregularity signal for the driving circuit to drive the motor to decelerate the rotation speed of the motor to a safe rotation speed.

According to the foregoing description, the first protection mechanism of the motor can be implemented by using the controller module to instruct the driving circuit to drive the motor for speed adjustment according to the power signal, and the second protection mechanism is implemented by using the monitoring circuit to instantly monitor the power signal received from the driving circuit and instantly transmitting the irregularity signal to the controller module once the power signal is abnormal to contingently lower the rotation speed of the motor to a safe rotation speed through the driving circuit, Accordingly, a double protection mechanism of the motor can be achieved to protect the motor and the secure roller controller as a whole against burn-down for assurance of higher operational stability and safety.

Other objectives, advantages and novel features of the invention will become more apparent from the following detailed description when taken in conjunction with the accompanying drawings.

DETAILED DESCRIPTION OF THE INVENTION

Figure 1:
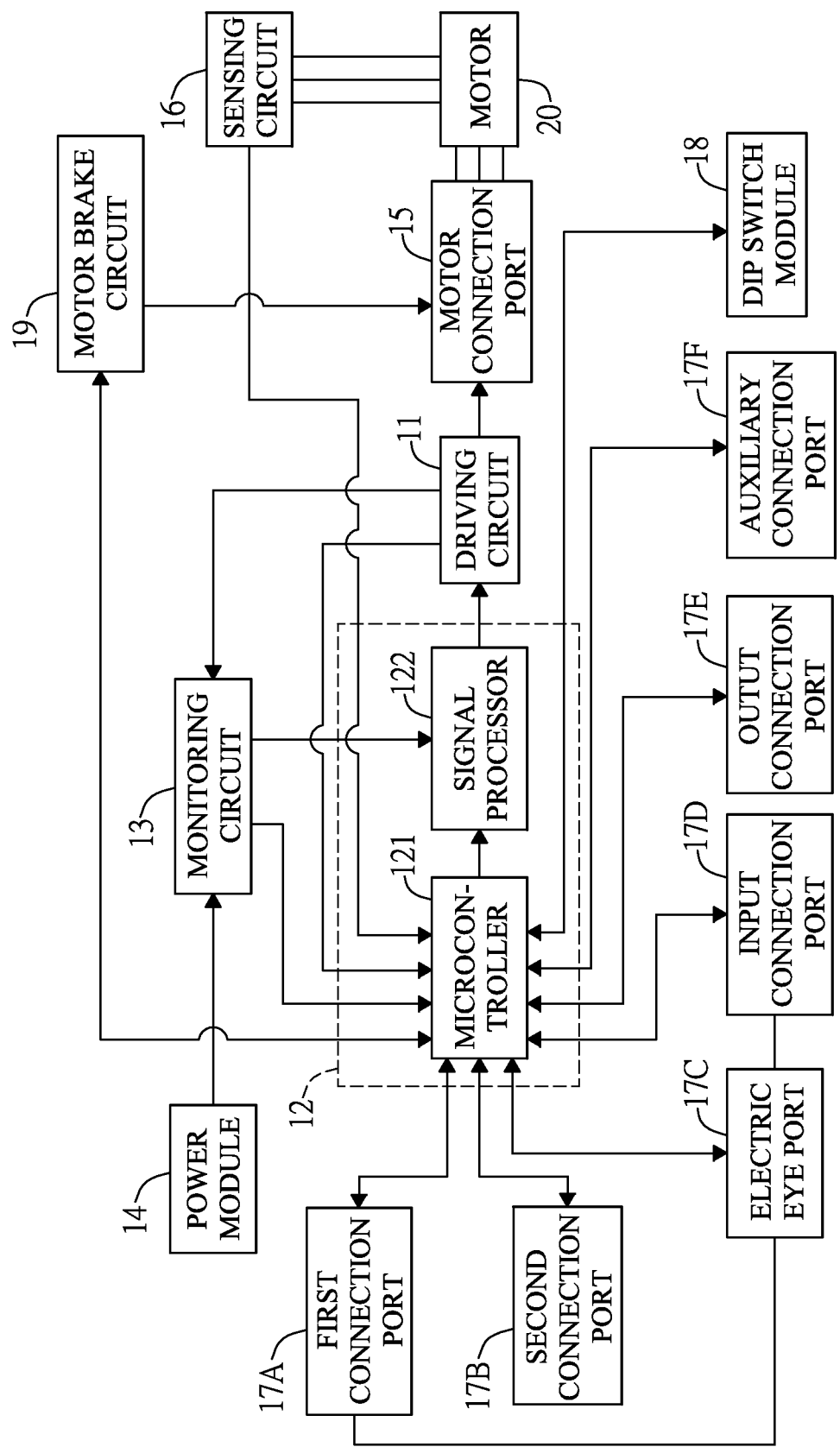
FIG. 1 is a functional block diagram of a secure roller controller of a roller conveyor system for logistics services in accordance with the present invention.

With reference to FIG. 1, a secure roller controller of a roller conveyor system for logistics services in accordance with the present invention includes a driving circuit 11, a controller module 12 and a monitoring circuit 13. The controller module 12 is electrically connected to the driving circuit 11 and the monitoring circuit 13. The driving circuit 11 is electrically connected to the monitoring circuit 13 and a motor 20, The monitoring circuit 13 is further electrically connected to a power module 14 for supplying power to the secure roller controller. In the present embodiment, the motor 20 is a three-phase motor including connection leads for phases U, V and W. Detailed circuit diagrams of the secure roller controller are shown in FIGS. 2 to 14. Circuit configuration, connection relationship and functionality of the secure roller controller are depicted as follows with the drawings.

Figure 2:
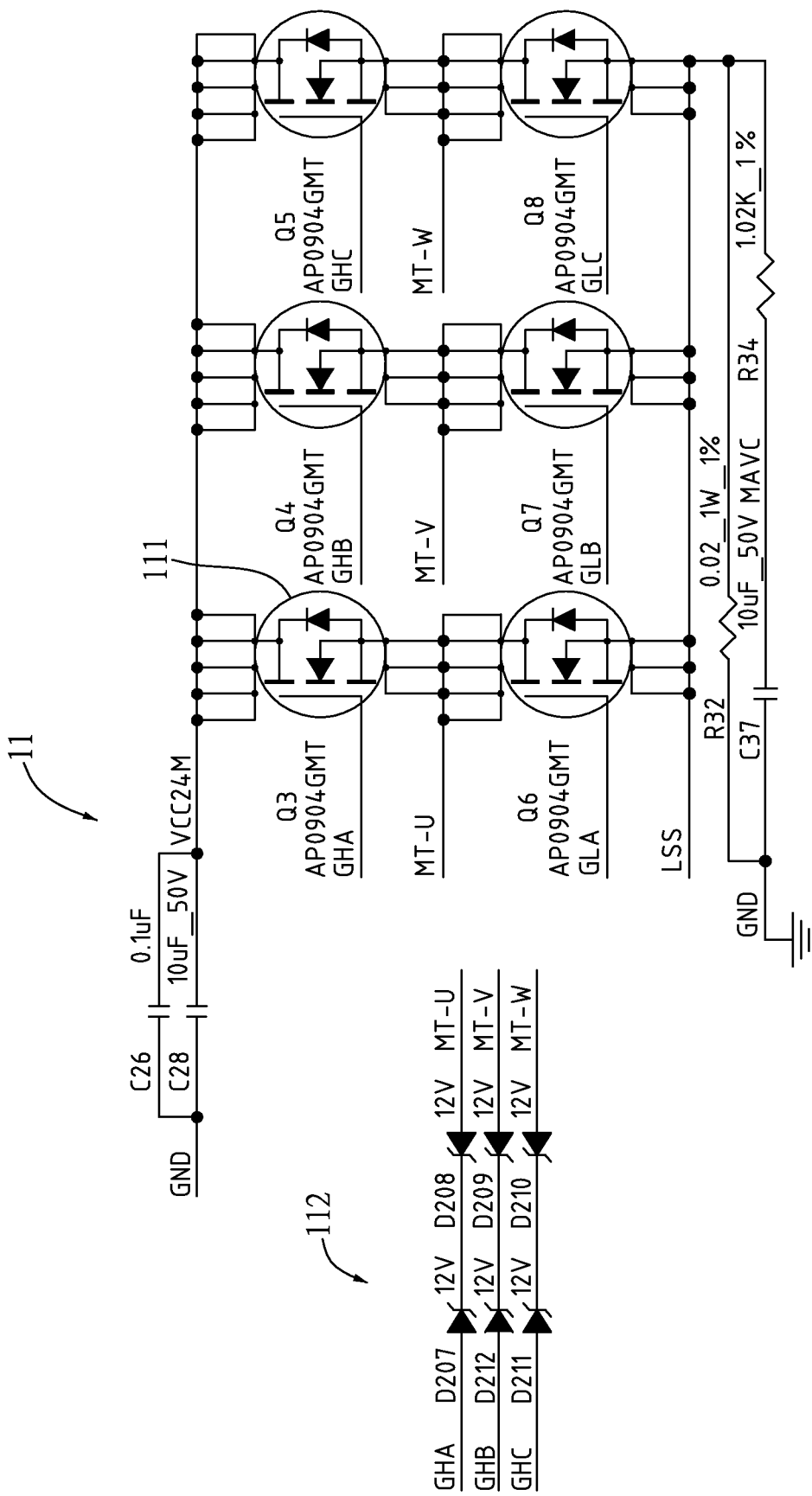
FIG. 2 is a circuit diagram illustrating a driving circuit of the roller controller in FIG. 1.

With reference to FIGS. 1 and 2, the driving circuit 11 has multiple connection terminals electrically connected to the controller module 12, the monitoring circuit 13 and the motor 20. The driving circuit 11 includes six power transistors 111 and a protection circuit 112. Each two of the six power transistors 111 are connected in series to form three power transistor strings, and the three power ransistor strings are connected in parallel to each other. Each power transistor string is connected to a corresponding connection lead for phase U, V or W to drive the motor 20 to rotate in a forward or reverse direction. By arranging the power transistor strings in the form of discrete transistors, heat generated by operation of the power transistors can be e ced and operational stability and lower power consumption can be attained. The part number of each power transistor 111 includes AP0904GMT. The protection circuit 112 serves to protect the power transistors 111 against burn-down arising from excessively large current.

Figure 3:
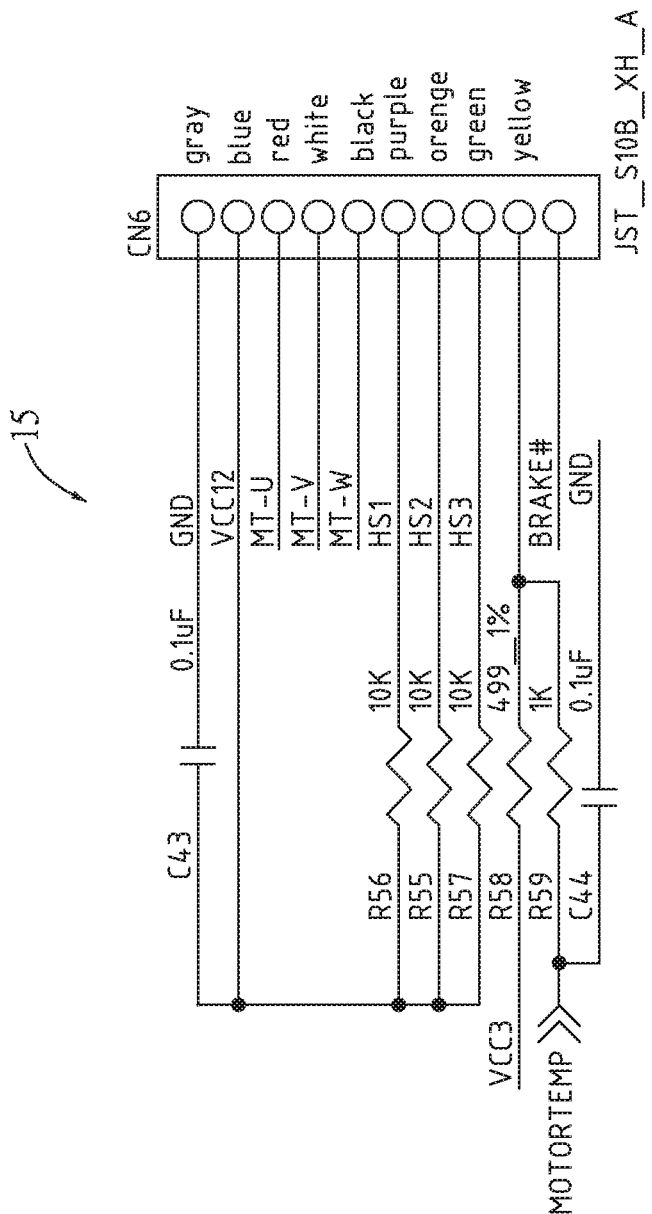
FIG. 3 is a circuit diagram illustrating a motor connection port of the roller controller in FIG. 1.
Figure 4A:
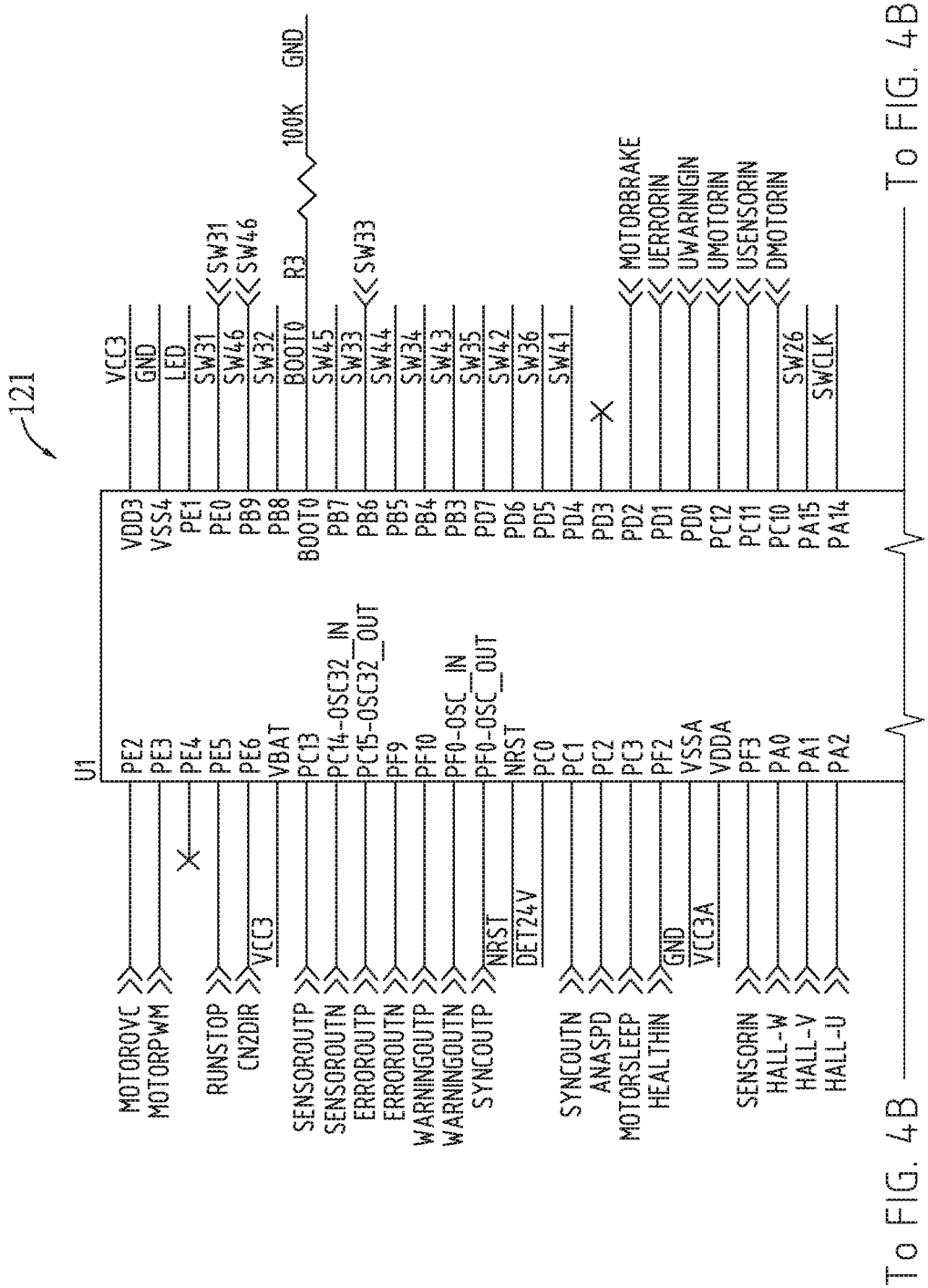
FIGS. 4A to 4C are partial circuit diagrams illustrating a microcontroller and a signal processor of the roller controller in FIG. 1.
Figure 4B:
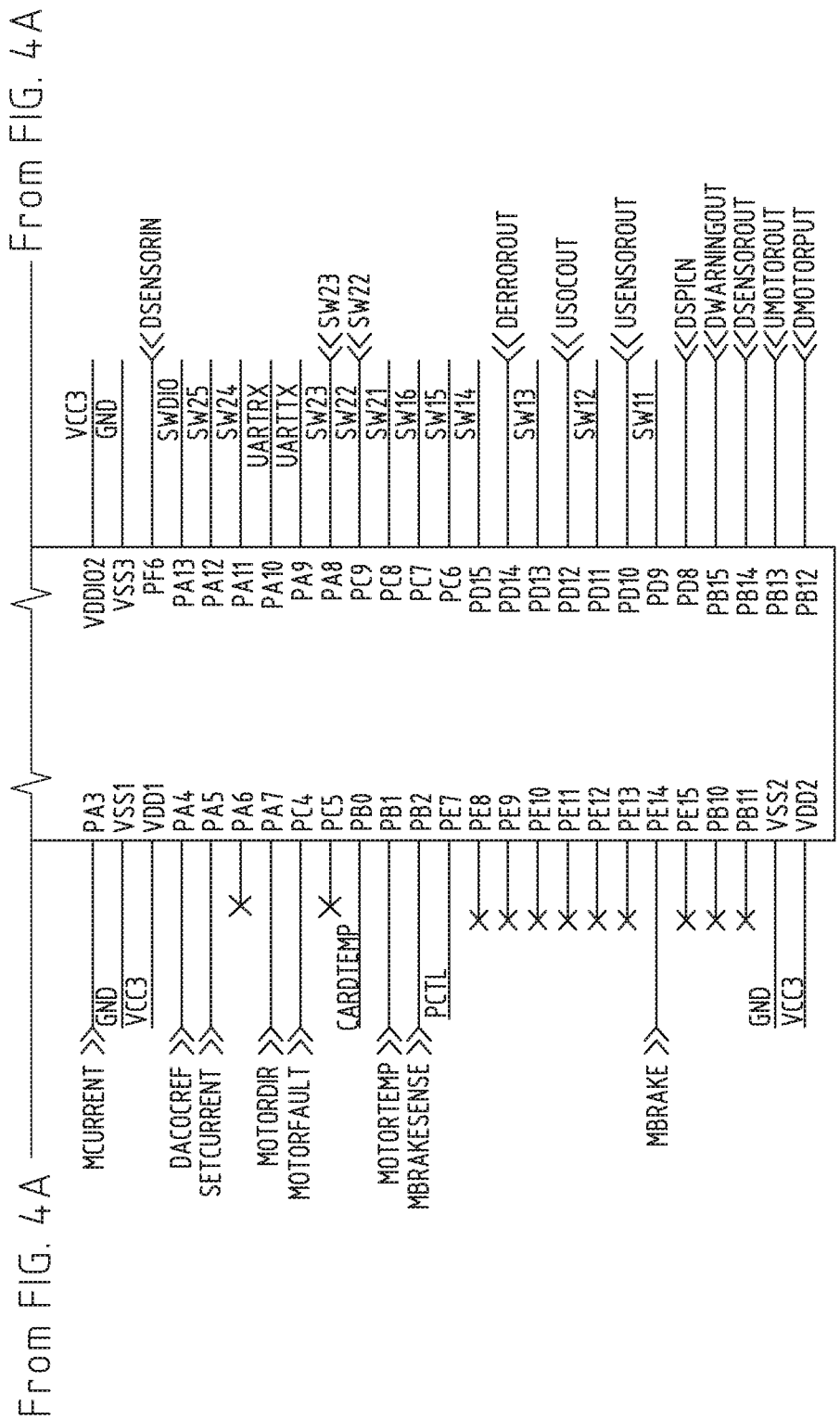
Figure 4C:
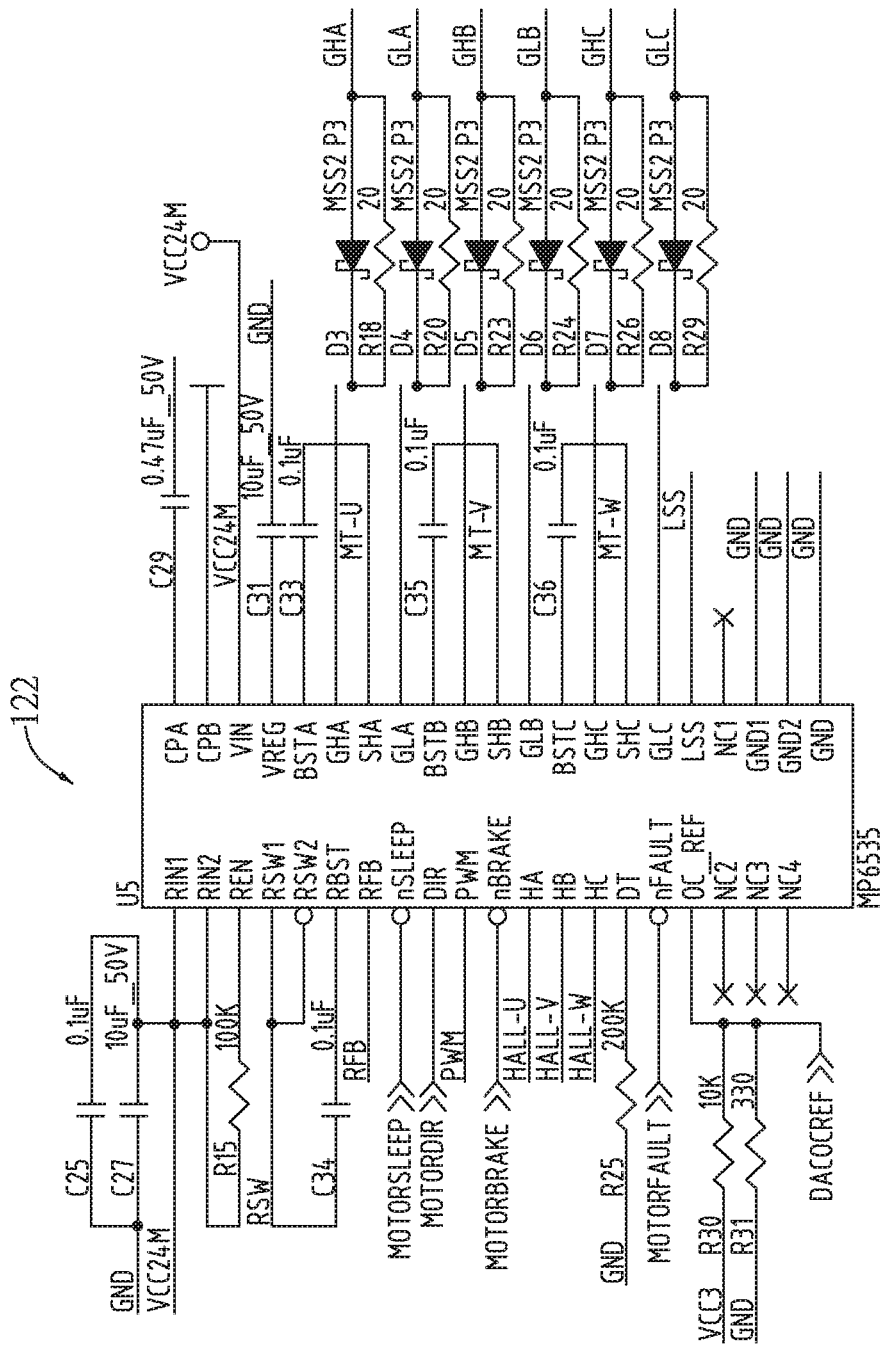

With reference to FIGS. 1 and 3, the secure roller controller further includes a motor connection port 15 connected between the driving circuit 11 and the motor 20 for the driving circuit 11 to be electrically connected to the motor 20 through the motor connection port 15.

With reference to FIGS. 1 and 4A to 4C, the controller module 12 includes a microcontroller 121 and a signal processor 122. The microcontroller 121 has multiple connection terminals electrically connected to the signal processor 122, the driving circuit 11 and the monitoring circuit 13. The signal processor 122 has multiple connection terminals electrically connected to the monitoring circuit 13 and the driving circuit 11. The microcontroller 121 receives a power signal from the driving circuit 11 for supplying power to the motor 20 and outputs a control signal to the signal processor 122 according to the power signal. The signal processor 122 outputs a motor control signal to the driving circuit 11 according to the control signal. The driving circuit 11 then outputs a driving signal to the motor 20 according to the motor controls signal for the motor 20 to adjust its rotation speed. In the present embodiment, the control signal includes a pulse width modulation (PWM) signal, and the motor control signal includes a PWM signal. When intending to accelerate the rotation speed of the motor 20, the pulse width of the PWM signal is increased. When intending to decelerate the rotation speed of the motor 20, the pulse width of the PWM signal is decreased. The part numbers of the microcontroller 121 and the signal processor 122 are STM32F071VXT6 and MP6535, respectively.

To prevent excessively large power to the motor 20, a first protection mechanism of the secure roller controller is to output a deceleration control signal to the signal processor 122 when the microcontroller 121 determines that the power signal is greater than a configured value. The signal processor 122 then outputs a motor deceleration control signal to the driving circuit 11 according to the deceleration control signal. The driving circuit 11 further outputs a deceleration driving signal to the motor 20 according to the motor deceleration control signal for the motor 20 to decelerate its rotation speed to a configured speed and protect the motor 20 and the secure roller controller against burn-down at the same time by virtue of such protection mechanism. In the present embodiment, the power signal includes a current value, which is configured to be 4 amperes.

Figure 5:
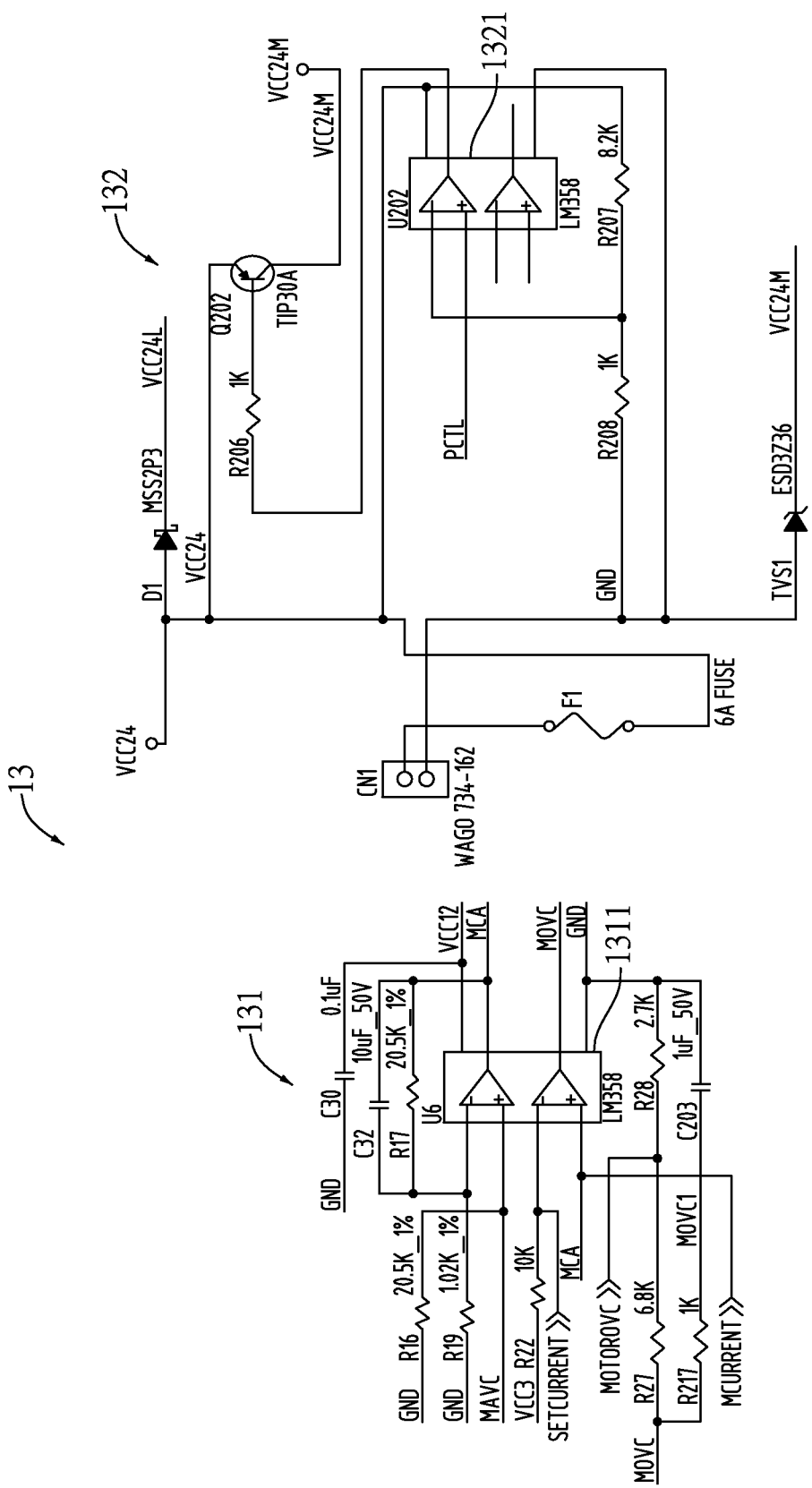
FIG. 5 is a circuit diagram illustrating a monitoring circuit of the roller controller in FIG. 1.

With reference to FIGS. 1 and 5, the monitoring circuit 13 has multiple connection terminals electrically connected to the microcontroller 121, the signal processor 122 and the driving circuit 11, The monitoring circuit 13 has a first monitoring circuit 131 electrically connected to the driving circuit 11 and the signal processor 122. As the microcontroller 121 needs to simultaneously process many signals, the motor 20 is easily burned down when the microcontroller 12 fails to instruct the driving circuit 11 to drive the motor 20 for speed reduction. Consequentially, the secure roller controller may be burned down as well. To address the issue, a second protection mechanism of the secure roller controller is to utilize the monitoring circuit 13 to detect whether the power signal received from the driving circuit 11 for supplying power to the motor 20 is abnormal. The first monitoring circuit 131 has a first comparator 1311, which determines if the power signal is greater than an irregularity threshold. When the power signal is greater than the abnormal threshold, the monitoring circuit 13 instantly outputs an irregularity signal to the signal processor 122. The signal processor 122 further instantly outputs a contingency protection signal to the driving circuit 11 according to the irregularity signal. Then, the driving circuit 11 instantly outputs a corresponding driving signal to the motor 20 according to the contingency protection signal for the motor 20 to instantly lower its rotation speed to a safe rotation speed, thereby protecting the motor 20 and the secure roller controller at the same time against burn-down. In the present embodiment, the irregularity threshold includes 4.2 amperes.

Besides, the monitoring circuit 13 further includes a second monitoring circuit 132 electrically connected to the power module 14 and the microcontroller 121 to detect whether the power module 14 supplies power abnormally. The second monitoring circuit 132 has a second comparator 1321. The monitoring circuit 13 receives an input power signal from the power module 14. The second comparator 1321 determines whether the input power signal is greater than a configured input value. If positive, the second monitoring circuit 132 outputs an irregular input power signal to the microcontroller 121 to stop operation of the microcontroller 121 for avoidance of burn-down.

Figure 6:
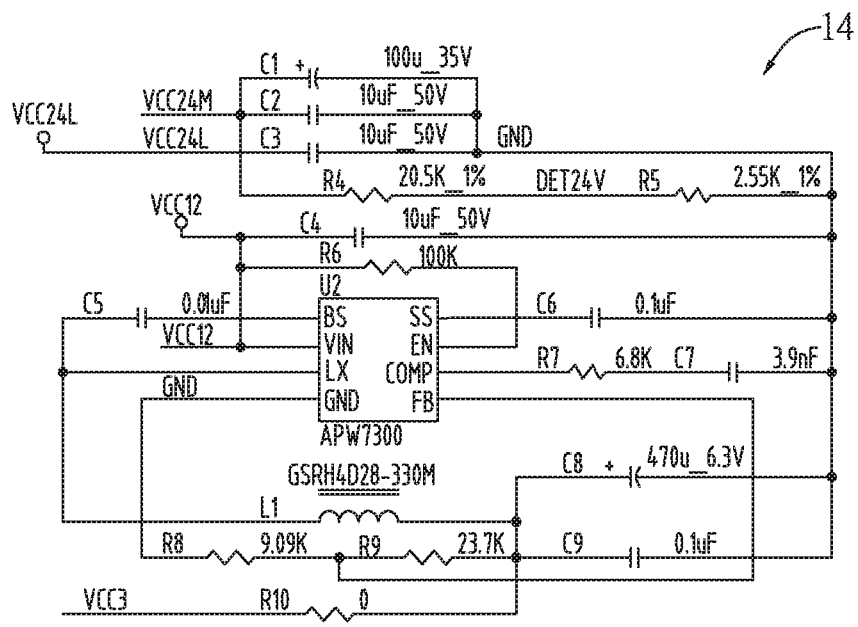
FIG. 6 is a circuit diagram illustrating a power module of the roller controller in FIG. 1.
Figure 6:
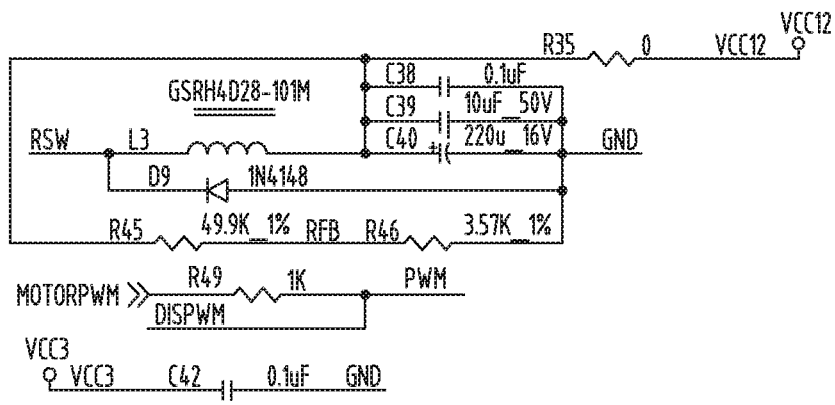

Moreover, with reference to FIGS. 1 and 6, the power module 14 includes a power conversion circuit 141, which converts power to have different voltage values to supply an operating power to all circuits in the secure roller controller for normal operation.

Figure 7:
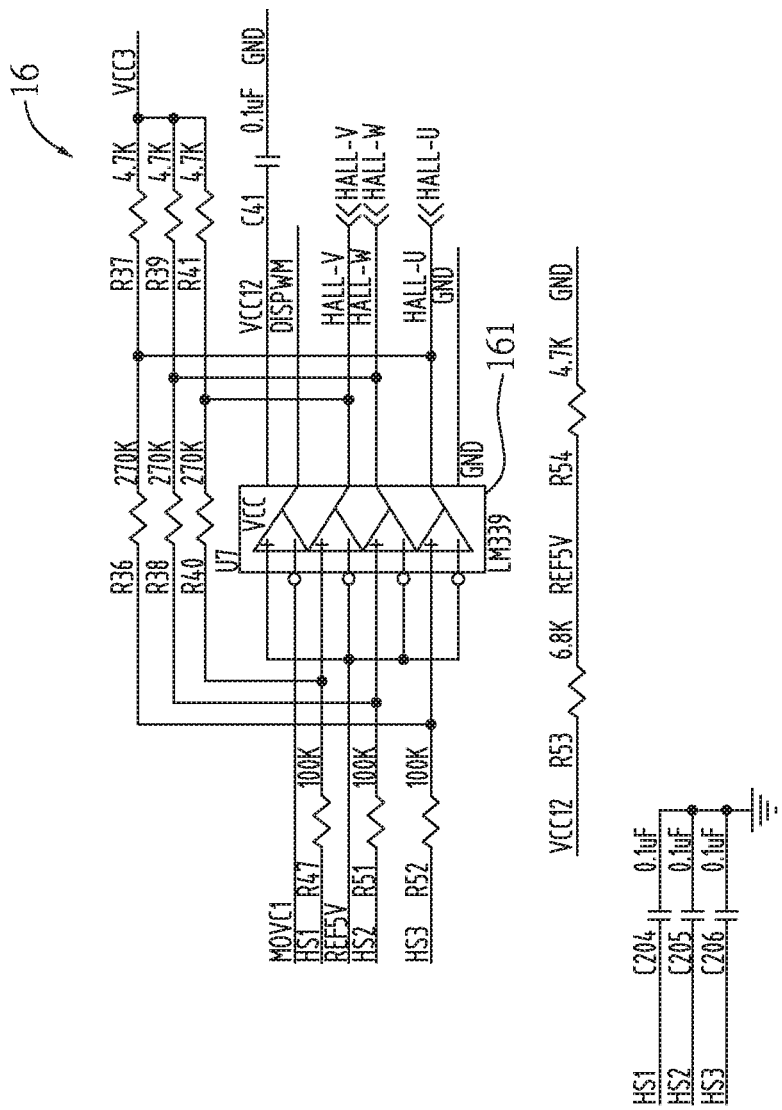
FIG. 7 is a circuit diagram illustrating a sensing circuit of the roller controller in FIG. 1.
Figure 8A:
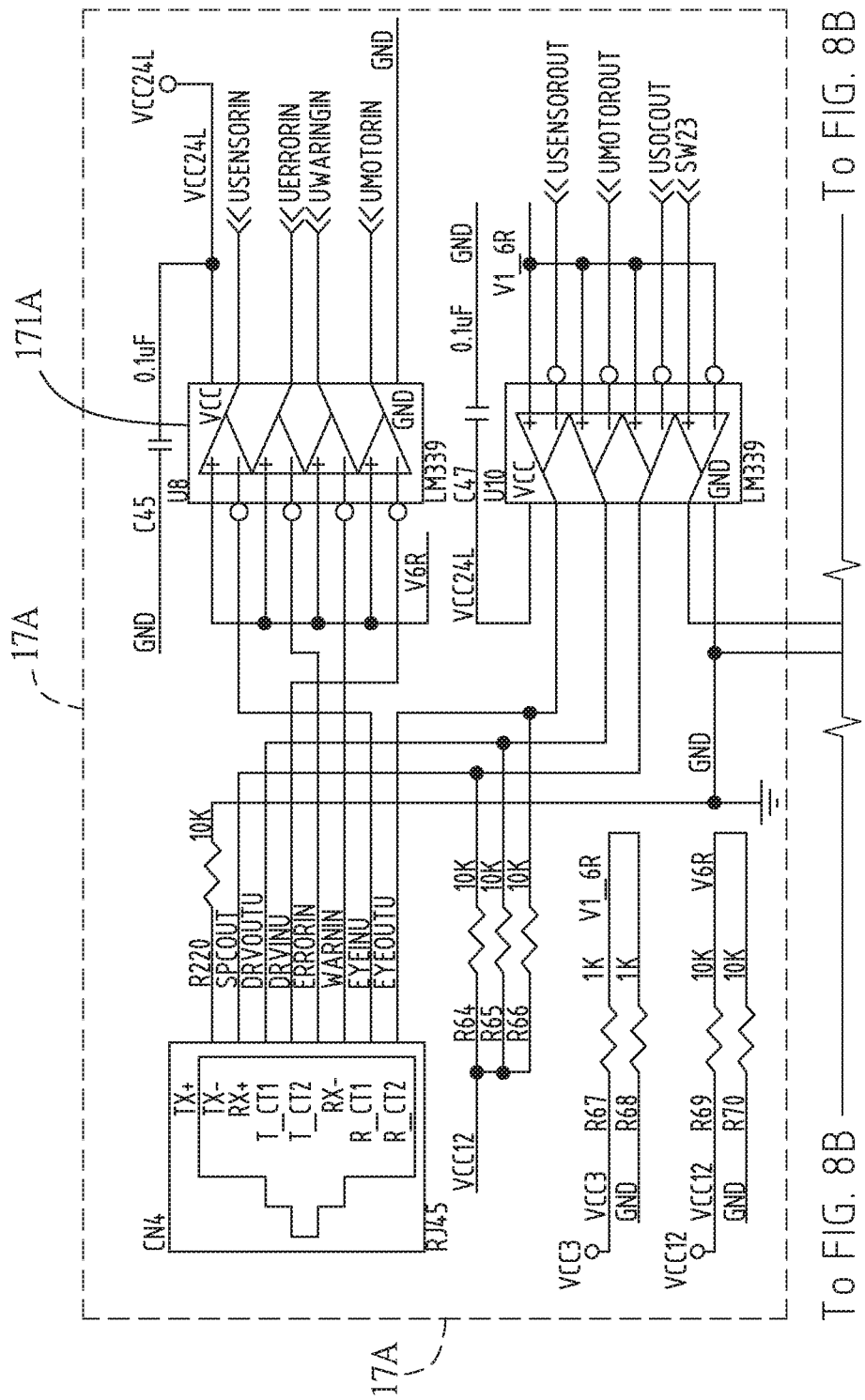
FIGS. 8A to 8C are circuit diagrams illustrating a first connection port, an electric eye port and an input port of the roller controller in FIG. 1.
Figure 8B:
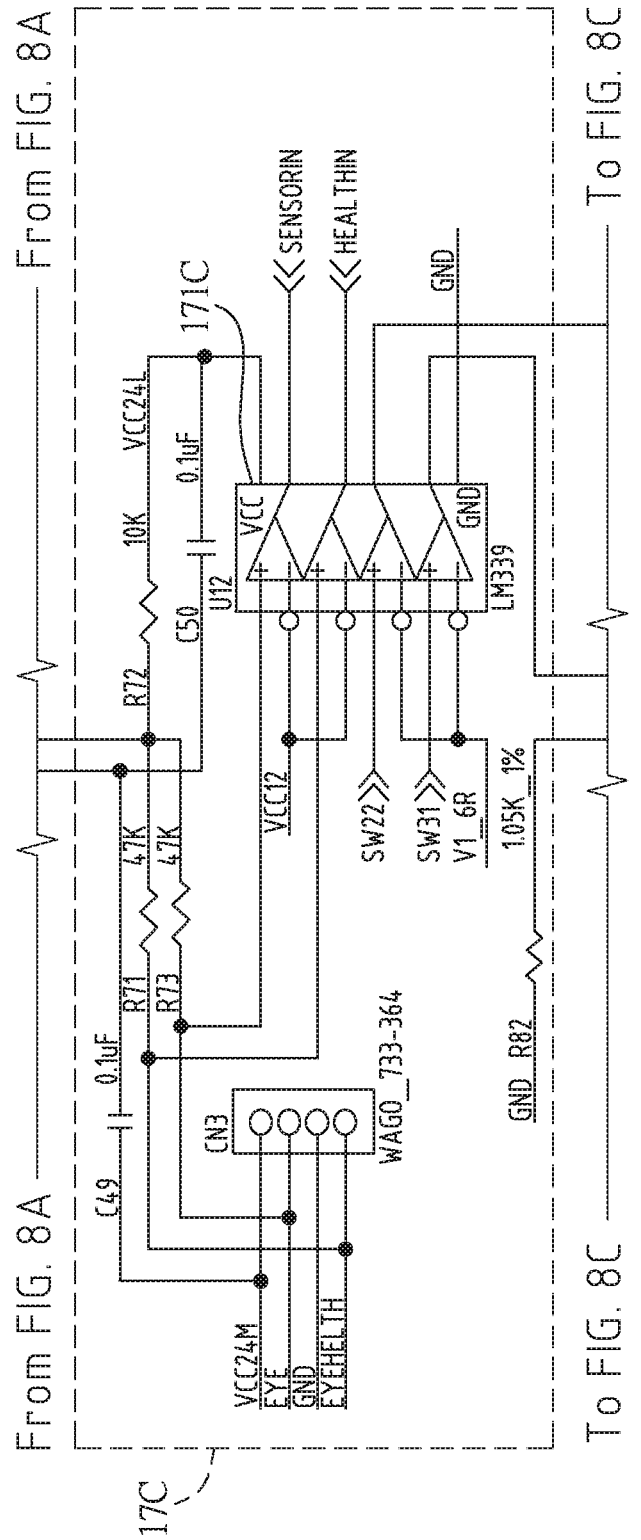
Figure 8C:
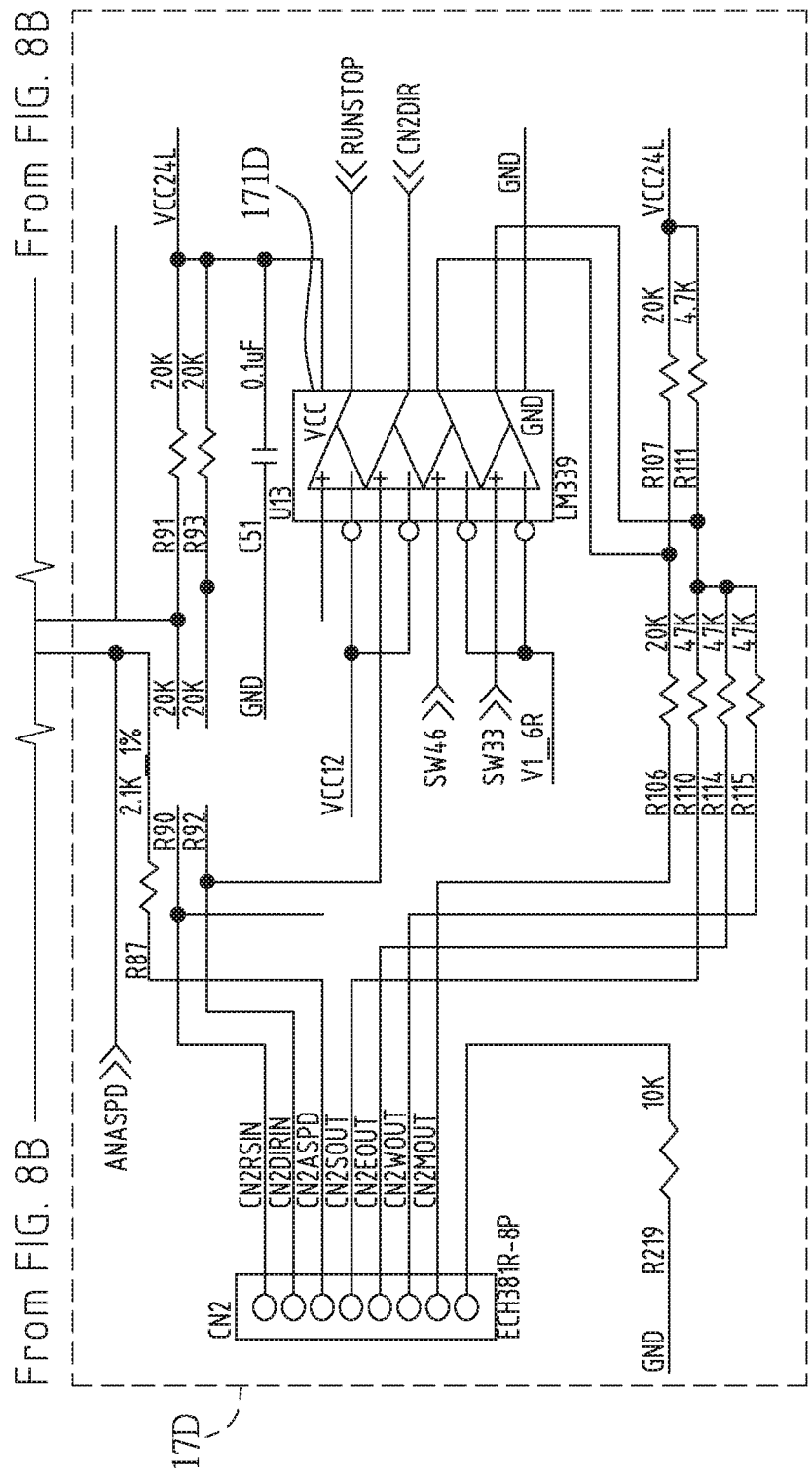

With reference to FIGS. 1 and 7, the secure roller controller further includes a sensing circuit 16 having multiple connection terminals electrically connected to the microcontroller 121 and the motor 20. The sensing circuit 16 serves to detect statuses such as phase sequence and the like. The sensing circuit 16 has a third comparator 161 to compare and convert a received signal and output a sensed motor status signal to the microcontroller 121 of the controller module 12. The microcontroller 121 transmits a corresponding control signal to the signal processor 122 according to the sensed motor status signal. The signal processor 122 further outputs a corresponding motor control signal to the driving circuit 11 according to the received control signal. The driving circuit 11 then drives the motor 20 to change a rotation direction of the motor 20. The sensing circuit 16 may include a Hall effect sensing circuit.

With reference to FIGS. 1 and 8A to 8C, the secure roller controller further includes a first connection port 17A with multiple connection terminals. The first connection port 17A is electrically connected to the microcontroller 121 of the controller module 12 and serves to be electrically connected to another secure roller controller. The first connection port 17A has a fourth comparator 171A and a fifth comparator 172A. The signals received by the fourth comparator 171; and the fifth comparator 172A are compared and converted and are transmitted to the microcontroller 121 for further processing. The first connection port 17A may be a RJ-45 connection port.

Figure 9:
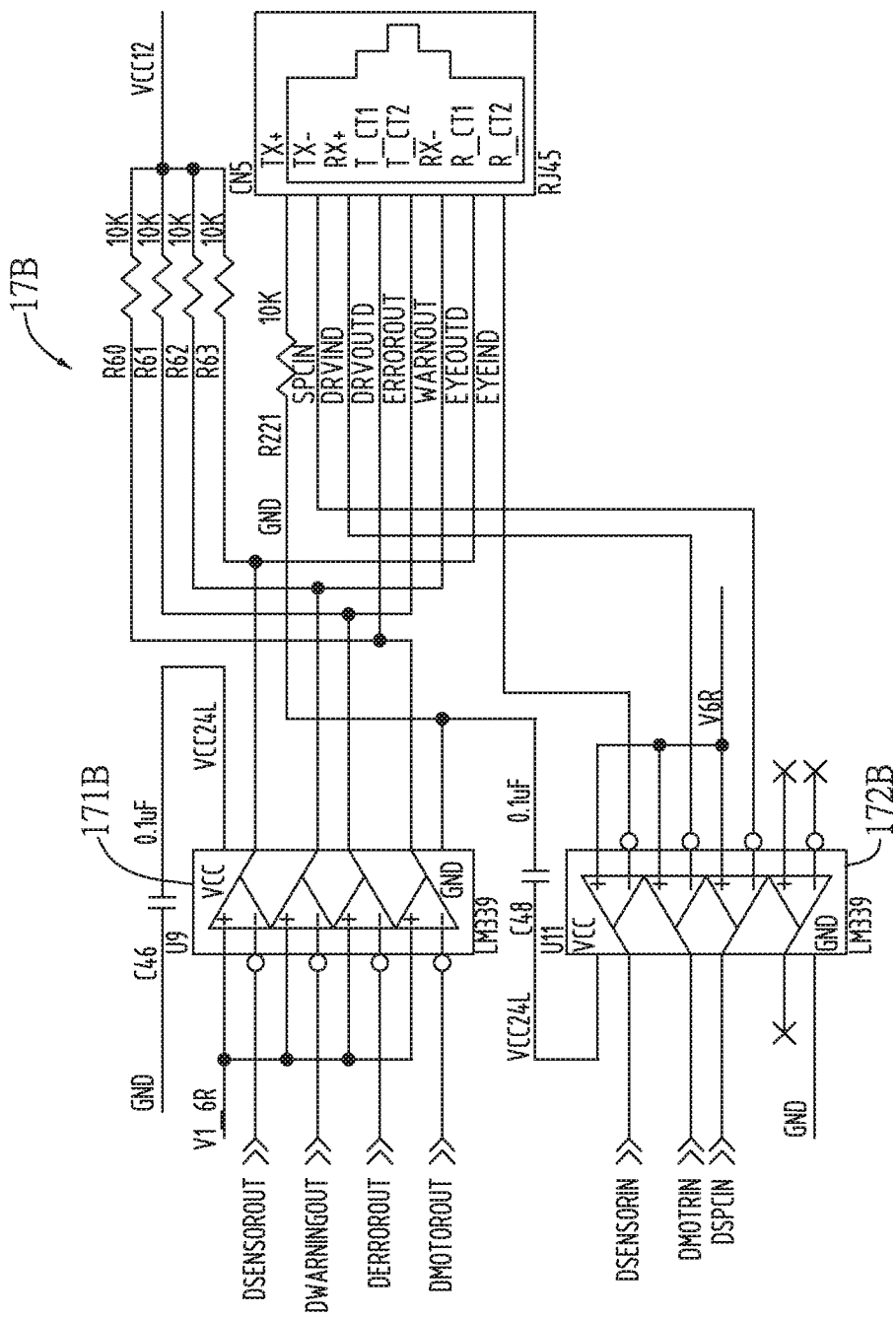
FIG. 9 is a circuit diagram illustrating a second connection port of the roller controller in FIG. 1.

With reference to FIGS. 1 and 9, the secure roller controller further includes a second connection port 17B with multiple connection terminals. The second connection port 17B is electrically connected to the microcontroller 121 of the controller module 12 and serves to be electrically connected to another roller controller. The second connection port 17B has a sixth comparator 171B and a seventh comparator 172B. The signals received by the sixth comparator 171B and the seventh comparator 172B are compared and converted and are transmitted to the microcontroller 121 for further processing. The second connection port 17B may be a RJ-45 connection port.

With further reference to FIGS. 1 and 8A to 8C, the secure roller controller further includes an electric eye port 17C with multiple connection terminals electrically connected to the microcontroller 121 of the controller module 12, the first connection port 17A and an electric eye device to capture at least one operating status of the electric eye device, which is compared and converted by an eighth comparator 171C of the electric eye port 17C and then is outputted to the microcontroller 121 for further processing. The at least one operating status includes a normal condition signal, an irregularity signal, and a brightness signal.

The secure roller controller further includes an input connection port 17D having multiple connection terminals and a ninth comparator 171D. The input connection port 17D is electrically connected to the microcontroller121 of the controller module 12 and the electric eye port 17C. The secure roller controller is connected to an external electronic device by using the input connection port 17D and the ninth comparatorto compare and convert signals through the input connection port 171) for operation personnel to update related operation procedures of the microcontroller 121.

Figure 10:
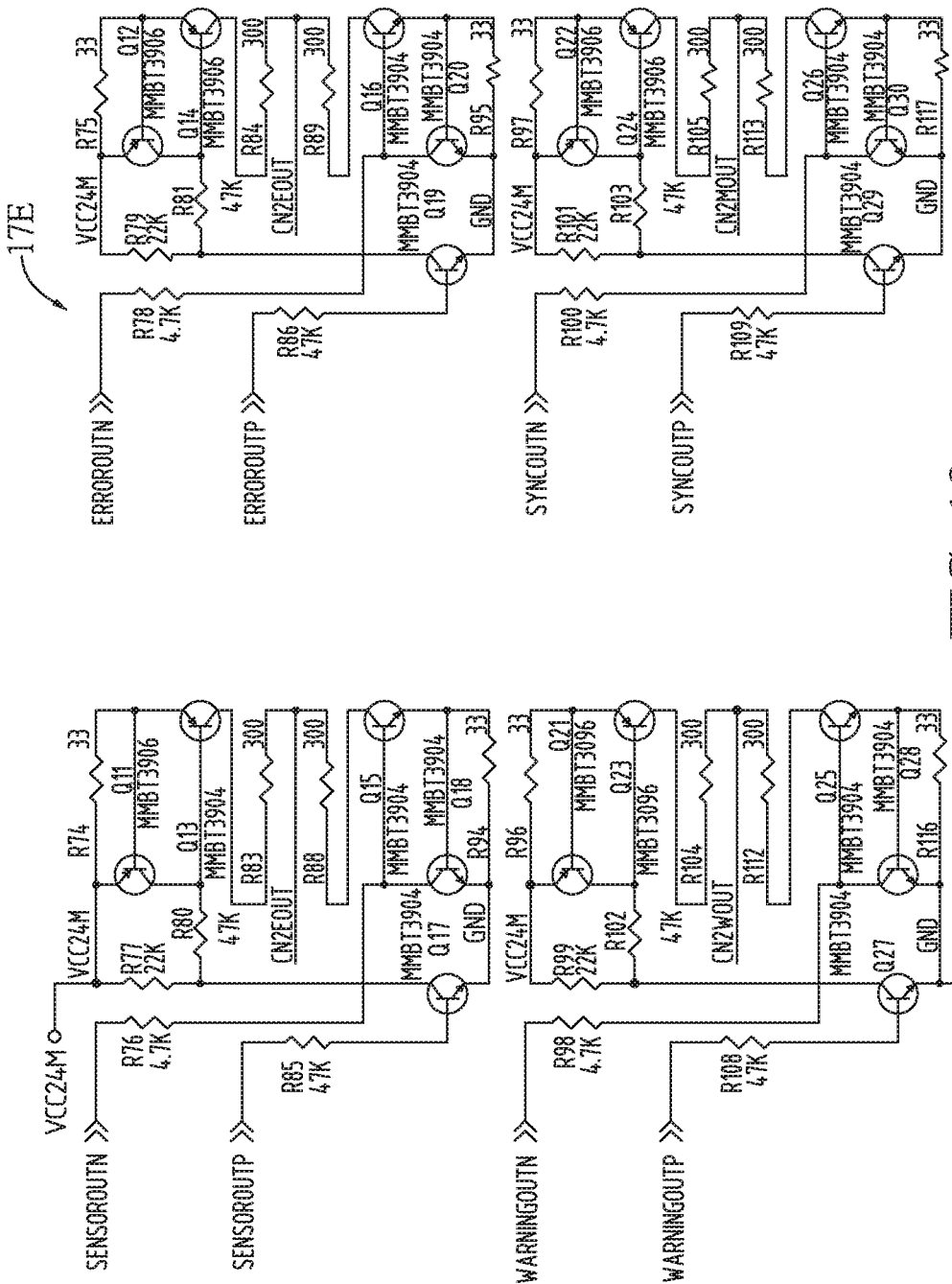
FIG. 10 is a circuit diagram illustrating an output port of the roller controller in FIG. 1.

With reference to FIGS. 1 and 10, the secure roller controller further includes an output connection port 17E having multiple connection terminals electrically connected to the microcontroller 121 of the controller module 12. The secure roller controller is connected to the external electronic device through the output connection port 17E for operation personnel to retrieve various parameters pertinent to related procedures executed by the microcontroller 121 for purpose of reference and operation.

Figure 11:
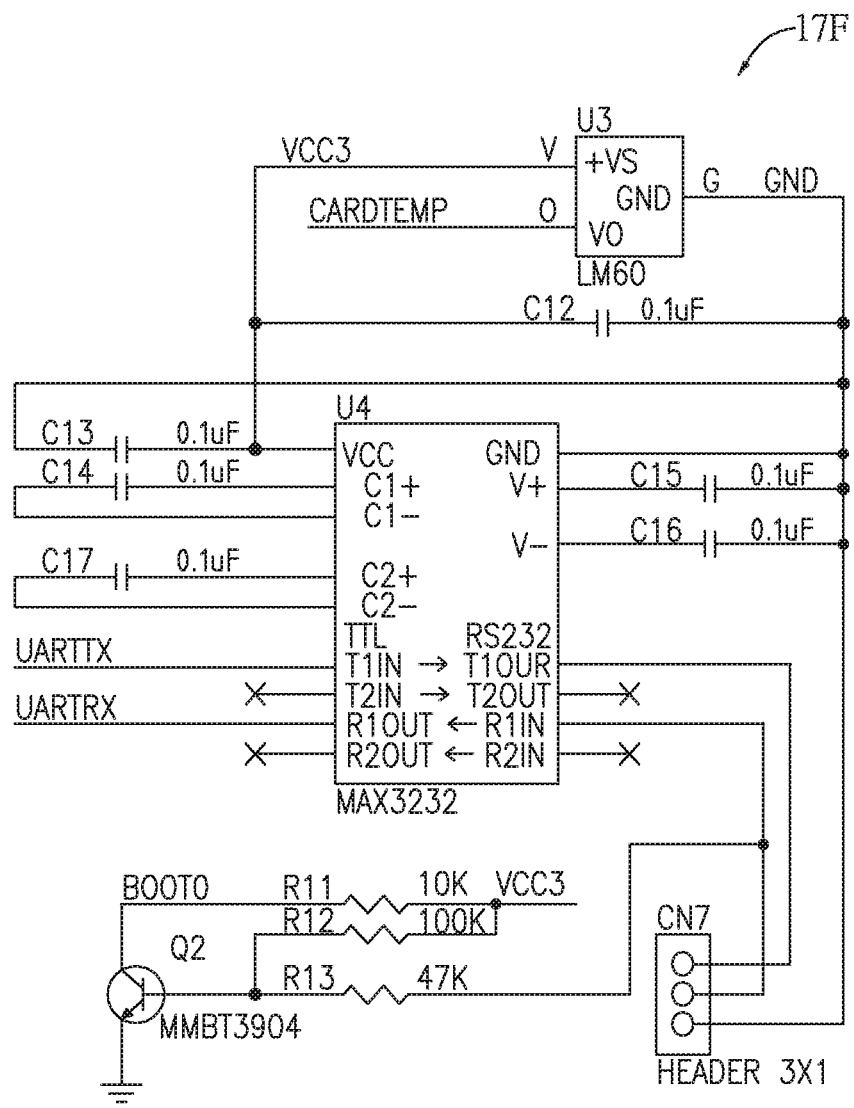
FIG. 11 is a circuit diagram illustrating an auxiliary port of the roller controller in FIG. 1.

With reference to FIGS. 1 and 11, the secure roller controller further includes an auxiliary connection port 17F having multiple connection terminals electrically connected to the microcontroller 121 of the controller module 12. The secure roller controller is connected to computer equipment through the auxiliary connection port 17F. The microcontroller 121 transmits the at least one operating status of the electric eye device, rotation direction and rotation speed of the motor 20, and irregular circuit signals to the computer equipment through the auxiliary connection port 17F for reference and operation. Moreover, operation personnel can utilize the computer equipment to directly transmit control signals to the microcontroller 121 through the auxiliary connection port 17F for the controller module 12 to drive the motor 20 to change the rotation speed and the rotation direction of the motor 20 through the driving circuit 11.

Figure 12:
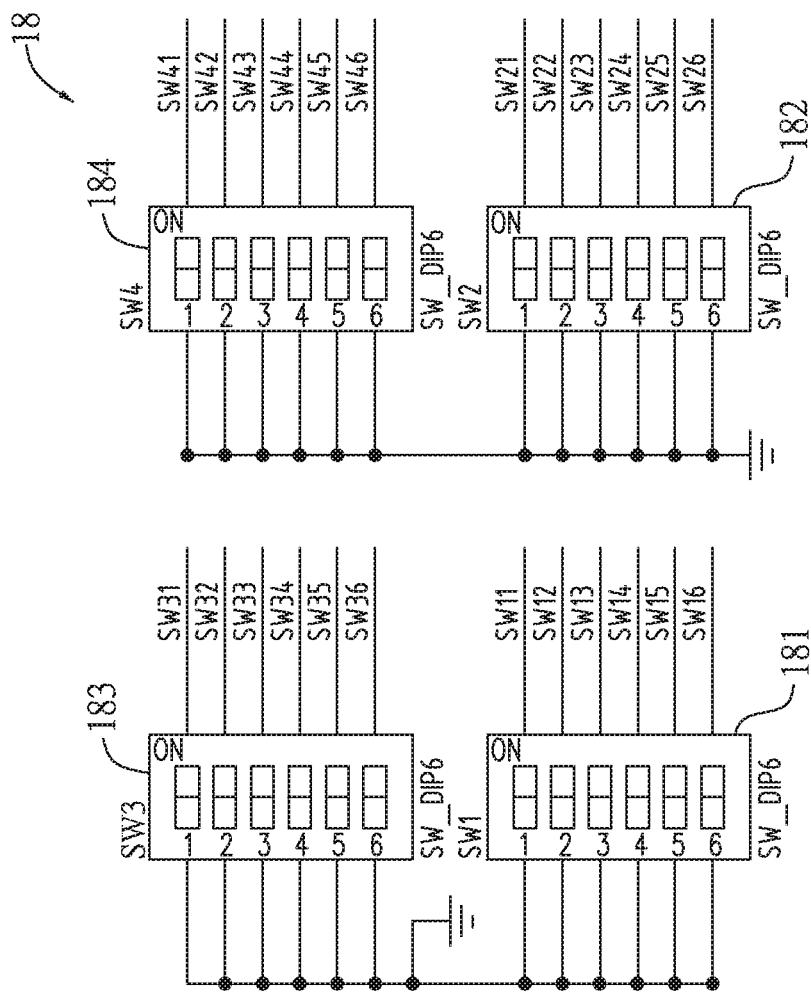
FIG. 12 is a circuit diagram illustrating a dip switch module of the roller controller in FIG. 1.

With reference to FIGS. 1 and 12, the secure roller controller further includes a dip switch module 18 having multiple dip switches electrically connected to the microcontroller 121. The multiple dip switches include a first dip switch 181, a second dip switch 182, a third dip switch 183 and a fourth dip switch 184. The first dip switch 181 serves to configure an elapsed time of a timer inside the microcontroller 121 and the rotation speed of the motor 20. The second dip switch 182 serves to configure a lighting brightness and a lighting zone of the electric eye device and On/Off of the motor 20. The third dip switch serves to configure the rotation direction, acceleration and deceleration of the motor 20. The fourth dip switch 184 serves to configure a normal torque or a high torque of the motor 20.

Figure 13:
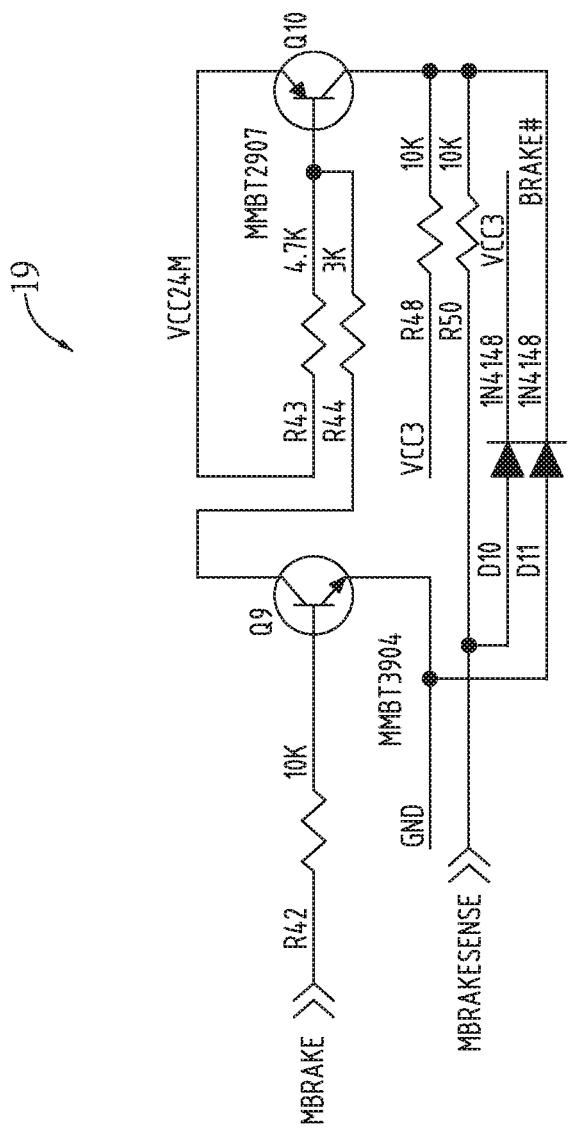
FIG. 13 is a circuit diagram illustrating a motor brake circuit of the roller controller in FIG. 1.

With reference to FIGS. 1 and 13, the secure roller controller further includes a motor brake circuit 19 electrically connected to the microcontroller 121. The microcontroller 121 sends a trigger signal to the motor brake circuit 19. When the microcontroller 121 is connected to the motor brake circuit 19, the motor brake circuit 19 returns a motor brake signal to the microcontroller 121 according to the trigger signal. When receiving the motor brake signal, the microcontroller 121 transmits a brake signal to the motor through the signal processor 122 and the driving circuit 11 for the motor to be started, such that the motor 20 may be positioned at a state of being braked to prevent the motor 20 from being started by malfunction when the motor 20 is not operated.

Figure 14:
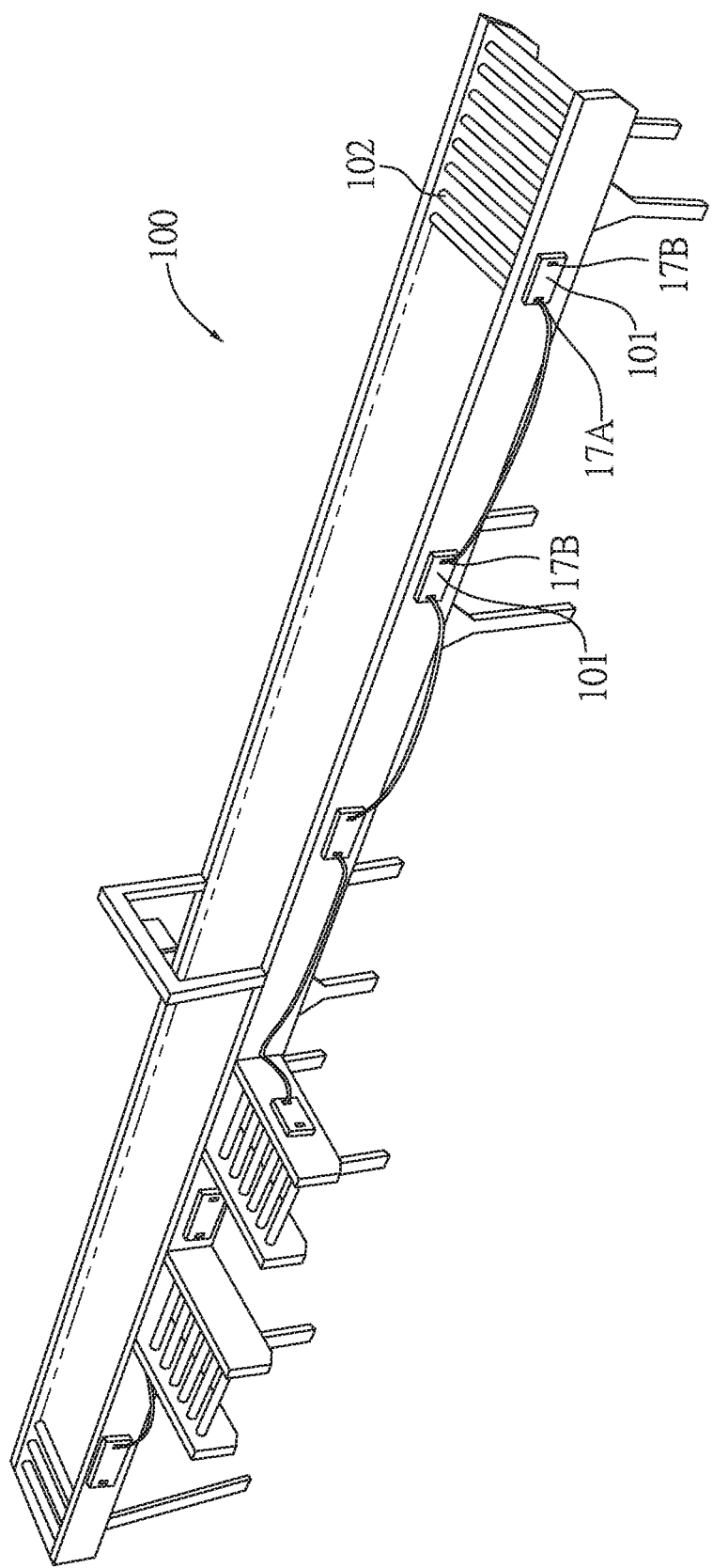
FIG. 14 is a perspective view of a roller conveyor system using the secure roller controller in FIG. 1.

With reference to FIGS. 1 and 14, a conveyor system for logistics using the secure roller controller includes multiple secure roller controllers 101, multiple rollers 102 and multiple motors (installed inside the rollers and thus not shown). Each secure roller controller 101 is electrically connected a corresponding motor, Two adjacent secure roller controllers 101 ahead and behind the secure roller controller 101 are electrically connected to each other via the first connection port 17A and the second connection port 17B, respectively. By virtue of the secure roller controller 100, operation of the corresponding motor can be controlled to drive a corresponding roller 101 to rotate so as to transport goods placed on the conveyor system.

In sum, given two-fold protection mechanisms to the secure roller controller for supplying power signals to the motor 20, the rotation speed of the motor can be instantly dropped when the motor 20 is detected to be abnormal, thereby effectively protecting the motor and the secure roller controller against burn-down and enhancing operational stability and safety.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A secure roller controller of a roller conveyor system for logistics services electrically connected to a motor, the secure roller controller comprising:
   a driving circuit electrically connected to the motor;

a monitoring circuit electrically connected to the driving circuit to receive a power signal of the driving circuit; and a controller module electrically connected to the monitoring circuit and the driving circuit, receiving the power signal, and outputting a motor control signal to the driving circuit according to the power signal for the driving circuit to drive the motor to adjust a rotation speed of the motor, wherein the controller module includes:

a microcontroller electrically connected to the driving circuit and the monitoring circuit; and a signal processor electrically connected to the driving circuit and the monitoring circuit;

wherein the microcontroller receives the power signal and determines if the power signal is greater than a configured value, and when the power signal is determined to be greater than the configured value, the microcontroller outputs a deceleration signal to the signal processor and the signal processor outputs a motor deceleration control signal to the driving circuit according to the deceleration control signal for the driving circuit to drive the motor to lower the rotation speed of the motor to a configured speed;

wherein when the monitoring circuit instantly detects that the power signal is irregular, the monitoring circuit instantly transmits an irregularity signal to the controller module, and the controller module further outputs a contingency protection signal to the driving circuit according to the irregularity signal for the driving circuit to drive the motor to decelerate the rotation speed of the motor to a safe rotation speed.

2. The secure roller controller as claimed in claim 1, wherein the monitoring circuit detects if the power signal is greater than an irregularity threshold, and when the power signal is determined to be greater than the irregularity threshold, the monitoring circuit instantly transmits the irregularity signal to the signal processor and the signal processor outputs the contingency protection signal to the driving circuit according to the irregularity signal for the driving circuit to drive the motor to lower the rotation speed to the safe rotation speed.

3. The secure roller controller as claimed in claim 2, wherein the driving circuit includes six power transistors, each two of the six power transistors are connected in series to form three power transistor strings, and the three power transistor strings are connected in parallel to each other and are electrically connected to three phase connection terminals of the motor respectively.

4. The secure roller controller as claimed in claim 3, further comprising a first connection port electrically connected to the controller module.

5. The secure roller controller as claimed in claim 4, further comprising a second connection port electrically connected to the controller module.

6. The secure roller controller as claimed in claim 5, further comprising an electric eye port electrically connected to the controller module.

7. The secure roller controller as claimed in claim 6, further comprising an input connection port and an output connection port electrically connected to the controller module.

8. The secure roller controller as claimed in claim 7, further comprising an auxiliary connection port electrically connected to the controller module.

9. The secure roller controller as claimed in claim 1, further comprising a dip switch module electrically connected to the controller module.

* * * * *